United States Patent [19]

Lippel

[11] Patent Number: 5,253,045
[45] Date of Patent: Oct. 12, 1993

[54] INTERPOLATING FINER INTENSITY LEVELS IN DITHER-QUANTIZED TELEVISION PICTURES

[75] Inventor: Bernard Lippel, West Long Branch Borough, N.J.

[73] Assignee: Quanticon Inc., West Long Branch, N.J.

[21] Appl. No.: 527,275

[22] Filed: May 23, 1990

Related U.S. Application Data

[63] Continuation-in-part of Ser. No. 461,009, Jan. 4, 1990, Pat. No. 5,148,273, and Ser. No. 282,471, Dec. 9, 1988, abandoned, and Ser. No. 180,344, Apr. 11, 1988, abandoned, and Ser. No. 779,254, Sep. 23, 1985, Pat. No. 4,758,893.

[51] Int. Cl.⁵ .................... H04N 9/64; H04N 5/213
[52] U.S. Cl. ........................ 358/37; 358/166
[58] Field of Search ............ 358/160, 13, 133, 138, 358/136, 167, 36, 37, 166, 168, 105; 382/54, 56

[56] References Cited

U.S. PATENT DOCUMENTS

| | | | |
|---|---|---|---|
| 4,642,689 | 2/1987 | Demmer | 358/166 |
| 4,652,905 | 3/1987 | Lippel | 358/13 |
| 4,692,811 | 9/1987 | Tsuchiya et al. | 358/282 |
| 4,758,893 | 7/1988 | Lippel | 358/209 |
| 4,979,228 | 12/1990 | Rzeszewski | 382/54 |
| 5,148,273 | 9/1992 | Lippel | 358/138 |

OTHER PUBLICATIONS

"Accurate Restoration of Intensity Levels Into Dither-Quantized TV", Digest of Technical Papers for the Society of Information Display International Symposium, May 17-22, 1992 pp. 1-3, Bernard Lippel.

"QuanTV Television Technology," Quantico Inc., FCC Advisory Committee on Advanced Television Services, Nov. 15, 1988, pp. 1-7.

"Digital techniques promise to clarify thee television picture," A A Goldberg, Electronics, Feb. 5, 1976, pp. 94-100.

*Primary Examiner*—James J. Groody
*Assistant Examiner*—Safet Metjahic

[57] ABSTRACT

A receiver interpolates finer intensity levels in critical areas of a dither-quantized TV picture that is sent (or recorded) with very few intensity levels. This improves picture rendition and reduces the visibility of stipple dots. One embodiment, for video quantized with multiphase ordered dither, substitutes the mean of several successive frames at all picture elements that are not changing with time. Another embodiment averages spatially on the frame in areas devoid of high-resolution detail. Both versions use a simple test for activity that permits instant pel-to-pel switching between averaged samples and input samples. The two embodiments can be combined.

24 Claims, 6 Drawing Sheets

INTERPOLATING FINER INTENSITY LEVELS IN DITHER-QUANTIZED TELEVISION PICTURES

This application is a continuation-in-part of the following: Application Ser. No. 07/461,009, filed Jan. 4, 1990, now U.S. Pat. No. 5,148,273, application Ser. No. 07/282,471, filed Dec. 9, 1988, now abandoned, application Ser. No. 07/180,344, filed Apr. 11, 1988, now abandoned, application Ser. No. 06/779,254, filed Sep. 23, 1985, now U.S. Pat. No. 4,758,893.

The application also relates to matter of my U.S. Pat. Nos. 4,758,893 and 4,654,704 and earlier patents referenced therein.

BACKGROUND

The invention disclosed herein improves certain TV systems transmitting coarsely quantized samples of the combination of a conventional video signal with a suitable dithering signal (called a dither). If the stream of dither-quantized samples is transmitted over an analog channel, similar to those used for conventional analog television, the samples can be regenerated to remove significant amounts of noise and interference; and if the samples are sent in digital form over a digital channel, the number of bits per sample is reduced, with corresponding reduction in the required channel bandwidth.

An undithered luminance or chrominance component of TV loses pictorial information when the signal amplitudes are restricted to a few quantum levels; the fewer the levels, the more visibly distorted is the image. Dithering in accordance with prior art superimposes dots of stipple on the quantized picture and the latter transmit perceptible information that would otherwise be lost. Efficient dithering patterns of prior art tend to maximize the amount of information transmitted in overlaid stipple while minimizing the visibility of the dots. Preferred TV dithers include the multiphase ordered dithers of the copending application Ser. No. 07/461,009 now U.S. Pat. No. 5,148,273, especially those called self-interpolating.

Stipple dots produced on, say, the luminance component are intensity increments added to single pels. In accordance with prior art, the relation between dithering signal amplitude and the number of quantum levels insures that said increments (i.e. dot amplitudes) are fixed at one quantum step while the population density of dots varies locally on the TV raster. With multiphase dithering (sometimes called cinematic dithering), the pattern of dots changes from frame to frame, of the picture, and low-pass spatio-temporal filtering by the human psychophysical system reduces visibility of stipple dots per se relative to the pictorial information that their population distribution transmits.

SUMMARY OF THE INVENTION

A TV transmitter sends a stream of video samples that are coarsely quantized with multiphase ordered dithering. A novel receiver generates another stream wherein, each input sample is replaced by a more finely quantized sample having the mean amplitude of selected samples. This interpolates additional intensity levels into the TV display and attenuates the amplitude of stipple dots in regions where they are most visible. However, many embodiments of the invention retain some coarse input samples in dynamically changing picture areas in order to prevent blurring of moving image detail.

DRAWINGS

FIG. 1 exemplifies various dither-quantized TV systems of prior art to which the invention pertains.

DETAILED DISCLOSURE

Figure 1:
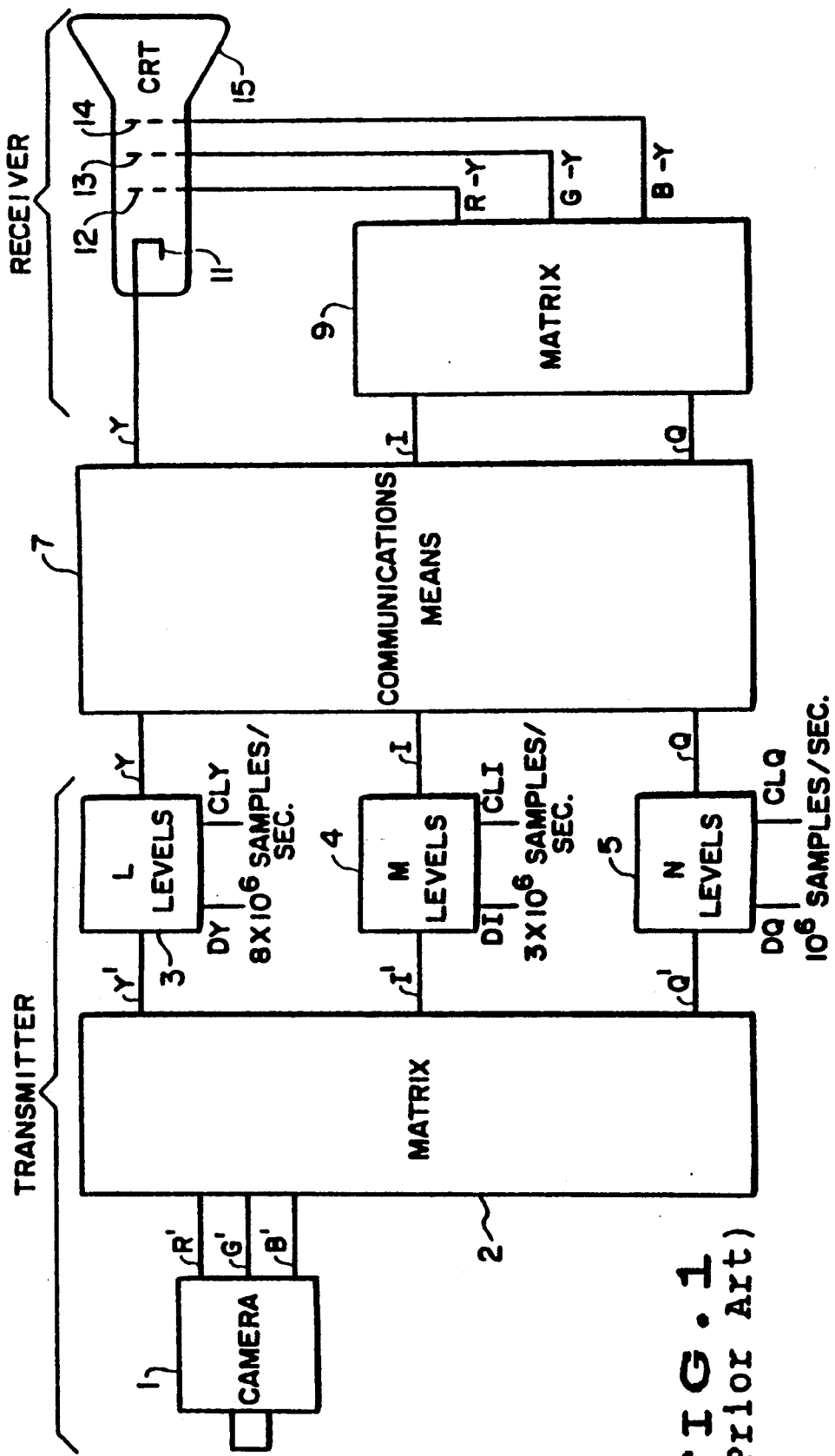

Various prior art systems to which the invention pertains are exemplified by FIG. 1 (the same as FIG. 1 of U.S. Pat. No. 4,652,905). Luminance component Y', and chrominance components I' and Q' from matrix 2 are dither-quantized in quantizers 3, 4 and 5 before transmission by communications means 7 (which may be a record) to be decoded and displayed in a receiver. CLY, CLI and CLQ are clock signals.

According to the invention, dithers DY, DI and DQ to quantizers 3, 4 and 5 are preferably, but not necessarily, dithers of my copending application, Ser. No. 07/461,009 now U.S. Pat. No. 5,148,2. Furthermore, a novel receiver modifies at least one of the dither-quantized signals Y, I and Q from means 7 before they go to picture tube 15 and matrix 9 (or are relayed to another receiver). Since novel processing of I and Q is similar to that of Y, embodiments of the receiver will be described in terms of the luminance component Y, and the manner of processing chrominance will be obvious to those having normal skill in the art.

Basic Method of Receiver Processing

Figure 2:
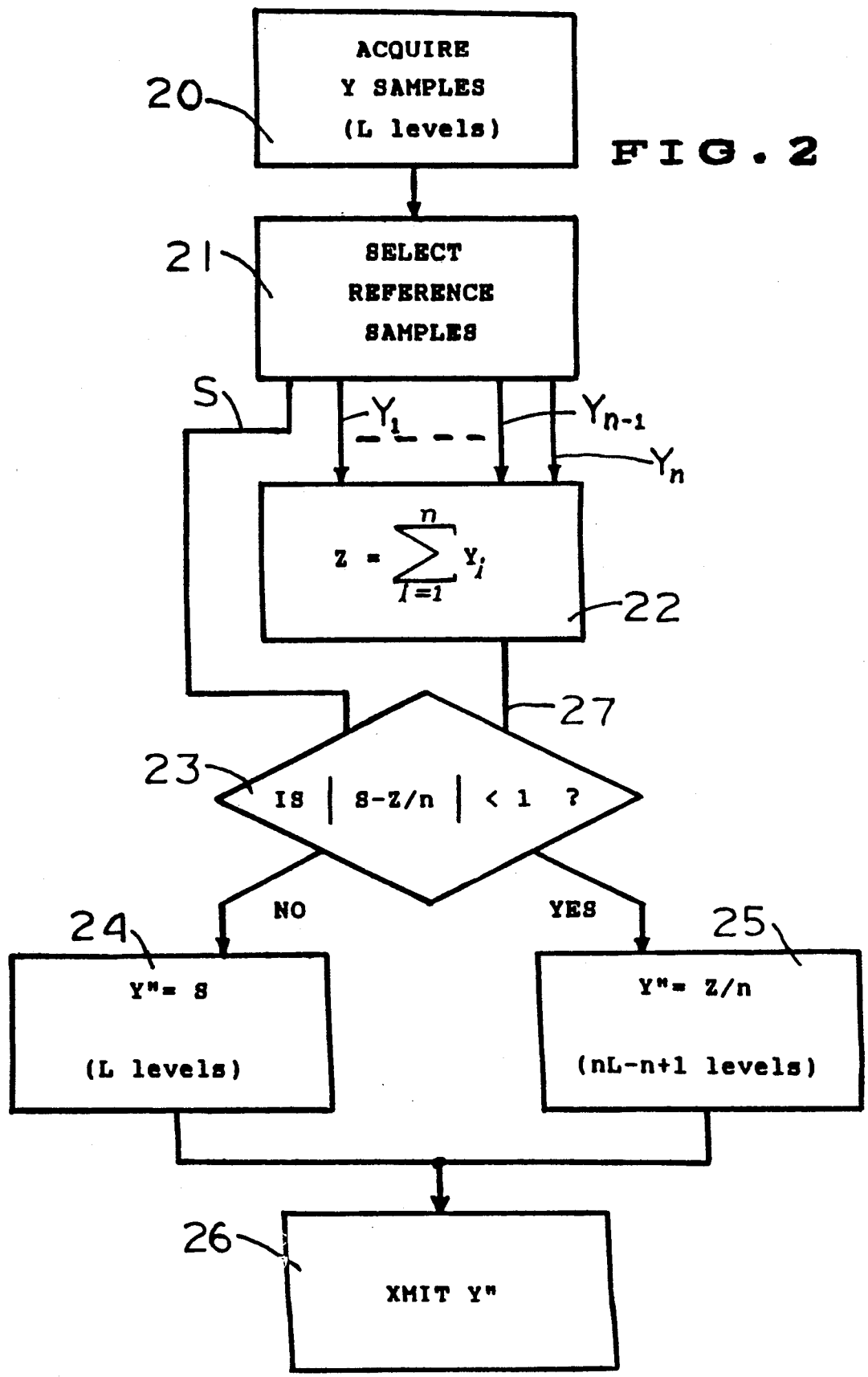
FIG. 2 is a flow diagram showing a general method of processing in the receiver, including retention of coarse samples in active picture areas.

FIG. 2 is a simplified flow diagram outlining methodology common to various receiver embodiments. In step 20, an input signal Y is a stream of Nyquist samples corresponding to successively scanned luminance pels. The samples are coarsely dither-quantized to have L levels, designated 0 to $L-1$ in units of a quantum step.

In step 21, n reference samples designated $Y_1$ to $Y_n$, and a sample designated S, are continuously extracted in parallel from the stream of Y samples. Sample S may optionally be one of the reference samples.

Step 22 adds amplitudes of concurrent reference samples (in units of the quantum step) and puts out a stream 27 of Z samples corresponding to the sums. Note that any integer number of units from 0 and $n(L-1)$, inclusive, is possible in a sum.

Step 23 of FIG. 2 continually recalculates the absolute amplitude difference between the current S sample and the current value of Z/n. A difference due solely to stipple is limited to less than one quantum step. In any case, if the difference is indeed less (steps 25 and 26), Z/n is transmitted in the output stream Y″; it has nL−n+1 possible levels, corresponding to n(L−1) quantum steps. Otherwise (steps 24 and 26), 9 is transmitted with L levels.

Exemplary Systems and Means

Prior-art systems exemplified by FIG. 1 send a dither-quantized video component from transmitter to receiver. Receivers of the invention include novel means to modify such a video component before the picture is displayed. Whereas the following disclosures of novel receiver embodiments describe processing of only the luminance component Y, it will be understood that I and Q chrominance components (or their equivalents) can be modified in like fashion.

Unless indicated otherwise, descriptions herein assume that Y is an analog signal comprising 4-level Nyquist samples and that it is transmitted in a composite TV signal such as that of the NTSC system. However, persons skilled in the art will perceive that the invention also applies to diverse other analog and digital TV systems dither-quantizing a video component.

Time Domain Embodiment

Figure 3:
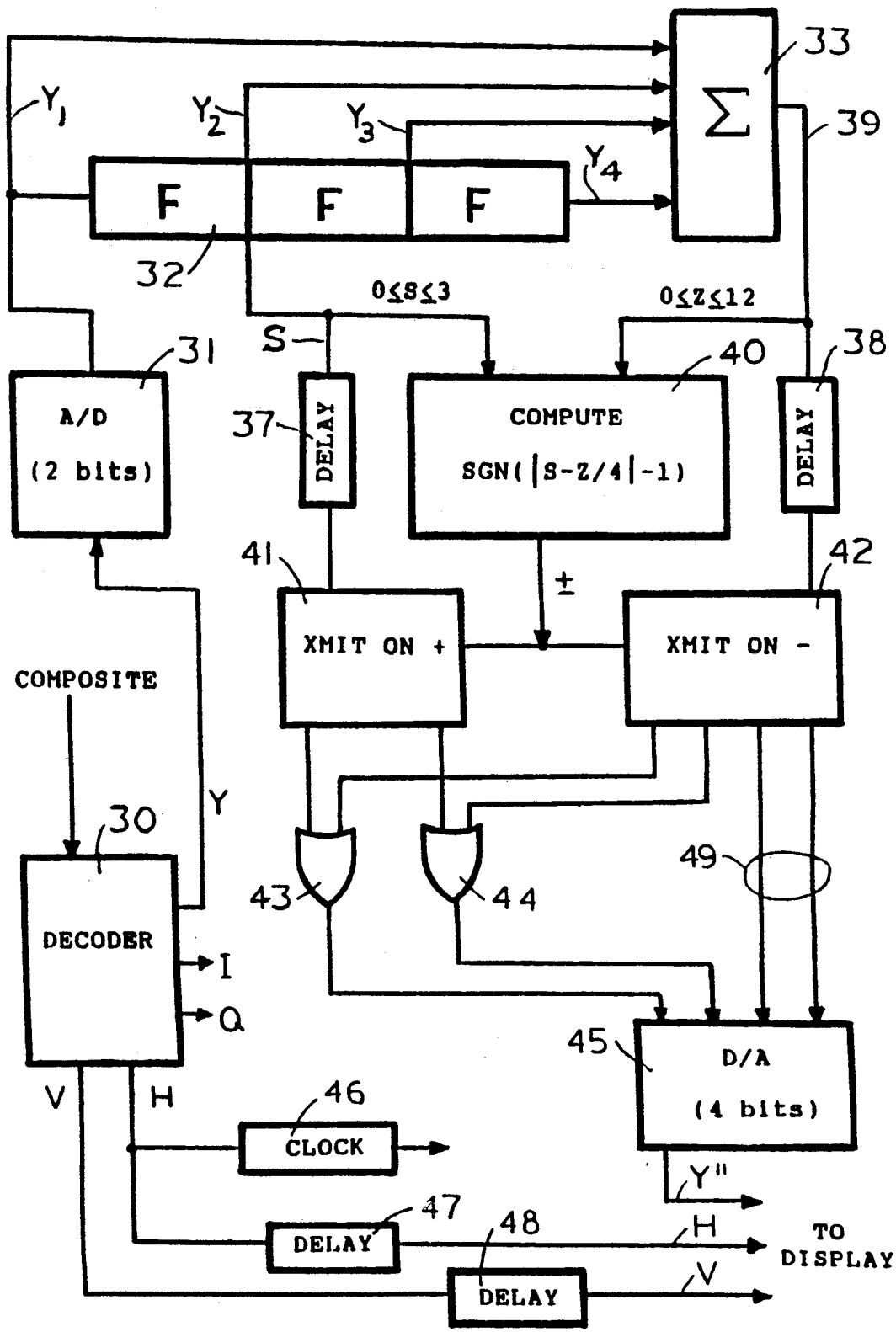
FIG. 3 shows a portion of a television receiver arranged to process an incoming dither-quantized video component according to one invention embodiment.

FIG. 3 is a schematic drawing disclosing a first embodiment of the invention. Decoder 30 decomposes the composite signal received at a TV receiver input and obtains Y, I and Q components, also line-sync H and frame-sync V. A/d converter 31 generates a stream of 2-bit binary samples corresponding to the 4-level Nyquist samples of the Y component. Means 32 is a tapped delay line of prior art, such as a tandem array of frame stores arranged so that successive frames can be entered and read out in synchronism. (The frame stores are labelled F to indicate one-frame delay). A stream of 2-bit numbers representing reference samples $Y_1$ from the a/d converter enters the delay line and also goes to digital adder 33. Also going to the adder in synchronism with the $Y_1$ samples are stream of numbers representing the following: reference samples $Y_2$, delayed one frame-time interval, reference samples $Y_3$, delayed two frames and reference samples $Y_4$, delayed three frames. Adder 33 adds four concurrent 2-bit numbers from the four streams and delivers stream 39 of 4-bit numbers corresponding to the sum Z. Since each of the four adder inputs is 0, 1, 2 or 3, the sum Z has thirteen possible values, ranging from 0 to 12 inclusive.

Concurrent S numbers and Z numbers enter arithmetic unit 40 and the latter computes the algebraic sign of the quantity $$|s-z/4|-1$$

assigning the negative sign to zero. The result is negative when the absolute difference between S and Z/4 does not exceed unity and positive otherwise. Positive output from unit 40 enables transmission of the 2-bit S sample through gating unit 41; negative output enables transmission of the 4-bit Z sample through gating unit 42.

Between gating unit 41 or 42 and d/a converter 45 (but not elsewhere on the drawing) a separate connecting line is drawn for each bit of a transmitted binary number. It is assumed that a disabled gate transmits all 0's. Since S numbers have two bits and Z numbers four, the more significant S bit and the most significant Z bit are presented to OR gate 43 while the less significant S bit and the second-most-significant Z bit go to OR gate 44. The remaining two Z bits (collectively labelled 49) and the two OR gate outputs go to 4-bit d/a converter 45 as shown in the drawing, the output from 43 being the most significant bit.

The output Y″ from a/d converter 45 is sufficient for display of the luminance picture on a suitable monitor when accompanied by line- and frame-sync signals H and V. Whenever the output from 40 is positive, the amplitude of a Y″ sample is, like the input Y, quantized with 0, 1, 2 or 3 units; and when the output is negative, new intensity levels are interpolated so that Y″ can have amplitudes 0.00, 0.25, . . , etc., up to 2.75 and 3.00 input units.

Even though unit 40 recalculates at the real-time sampling rate, its output may be delayed relative to the S and Z inputs. Delay units 37 and 38 for S and Z, and 47 and 48 for the line-sync and frame-sync, may therefore be provided to compensate for such delay. It is not necessary to compensate the line-sync and frame-sync for delay of $Y_2$, $Y_3$ and $Y_4$, since each is delayed an integral numbers of frame times.

Clock signal generator 46 is phase-locked to the line-sync signal or otherwise synchronized according to prior art. Although clocking inputs have been omitted to simplify the drawing, persons skilled in the art will understand that digital and other units receive clock pulses from unit 46 as required.

To examine the effect of the FIG. 3 embodiment, assume that the camera scans an unchanging scene and that background noise is negligible. In unquantized signal Y′ of FIG. 1, the samples that correspond to a particular element (pel) of the scanning raster do not change from frame to frame, and the corresponding samples put out by dithered quantizer 3, can only oscillate from frame to frame between two adjacent quantum levels when DY is multiphase dither. Therefore, samples of one raster element on successive frames do not differ from each other—or from their mean value—by more than one step of quantizer 3 wherever the picture is stationary.

During reception of the TV picture, the apparatus of FIG. 3 continually compares S (a copy of the received signal Y) with Z/4 (the mean from four successive frames) and computes their difference. If the magnitude of the difference is less than a quantizer step, Z/4 is transmitted for display; this is equivalent to showing the mean image of four successive frames in areas where image detail does not change. An averaged image is displayed with thirteen, instead of four, luminance levels without significant effect on spatial resolution.

Moving objects seen by the camera may be blurred in an averaged image; therefore, the 2-bit sample S (corresponding to a single frame), not the 4-bit sample Z/4 (corresponding to a time-average), is displayed wherever on the raster the difference between S and Z/4 exceeds one step of quantizer 3. It is well known that the human psychophysical system has increased tolerance for artifacts in picture details that are moving or otherwise changing with time.

It should be clear that the number of input levels, number of reference samples, choice of S, etc., are exemplary in FIG. 3 and that I may choose other parameters and arrangements within the spirit of the invention.

Although the invention also benefits video signals dither-quantized with various other kinds of time-varying dithers, certain multiphase ordered dithers disclosed in copending application Ser. No. 07/461,009 now U.S. Pat. No. 5,148,273 are preferred.

Figure 5:
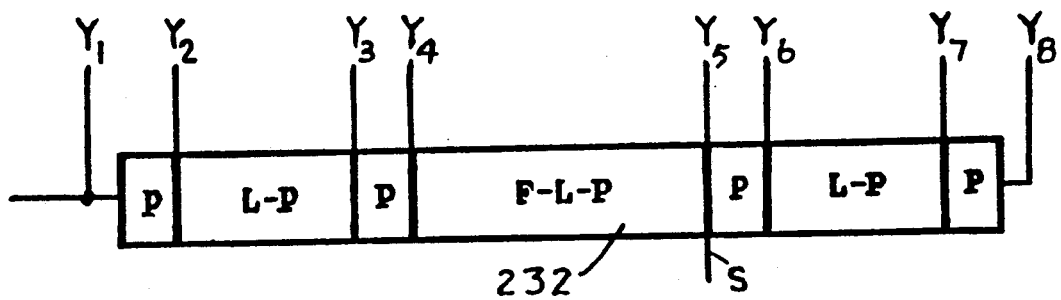
FIG. 5 represents constituent means that may be substituted for corresponding constituent means of FIG. 4 to provide a third embodiment of the invention.

In particular, FIGS. 3 and 5 show ordered dithers having 16 phases and 16 dither sizes that are also self-interpolating. For video signals quantized with such dithers, averaging over four frames produces ideal low-amplitude stipple in the picture—i.e. stipple that oscillates within adjacent pairs of the fine quantum levels, just as if the original quantizer had more steps. Averaging over eight frames and certain other specific numbers of frames also produces ideal stipple with dithers of the self-interpolating class disclosed in the copending application.

If sixteen samples are used—so that the number of dither sizes, dither phases and averaged frames are all equal—stipple is absent from the finely quantized output. More generally, given a video signal quantized with any n-phase ordered dither that has n dither sizes (n an integer larger than unity), the FIG. 3 system provides stipple-free images in areas of no change when it averages all n phases. I may, for example, modify the dither of FIG. 5 of the copending application so that both the number of sizes and number of phases are reduced to eight, then employ a delay line with eight taps. Furthermore, dithers of a type called "one-cycle" in U.S. Pat. No. 4,758,893 always have n sizes and n phases and would be suitable when constructed with frame patterns that are efficient for the intended application.

I may make various other modifications to the FIG. 3 example without departing from the spirit of the invention. For example:

I may substitute equivalent analog means and processing for some of all of the digital means disclosed.

I may use another reference stream for S, instead of $Y_2$ as shown; in fact, S could be obtained one or more frames later than $Y_4$ (or earlier than $Y_1$) so as to anticipate (or to delay) the switching between coarse and fine modes.

If the scanning raster is line-interlaced, I may arrange the FIG. 3 embodiment to sample either frames, as shown, or fields.

I may subtract the absolute difference in means 40 from a constant other than exactly unity in order to enhance or diminish sensitivity to image change, or to obtain artistic or other special effects.

I may employ one set of reference samples to obtain a first average from a larger number of frames and another set of samples to obtain a second average from a smaller number of frames. I may then arrange to quantize with at least three degrees of fineness, transmitting finest samples when the first average is within one step of S, medium-fine samples when only the second average meets this criterion, and coarse input samples when the criterion is not met at all.

Recorded Signals

Figure 8:
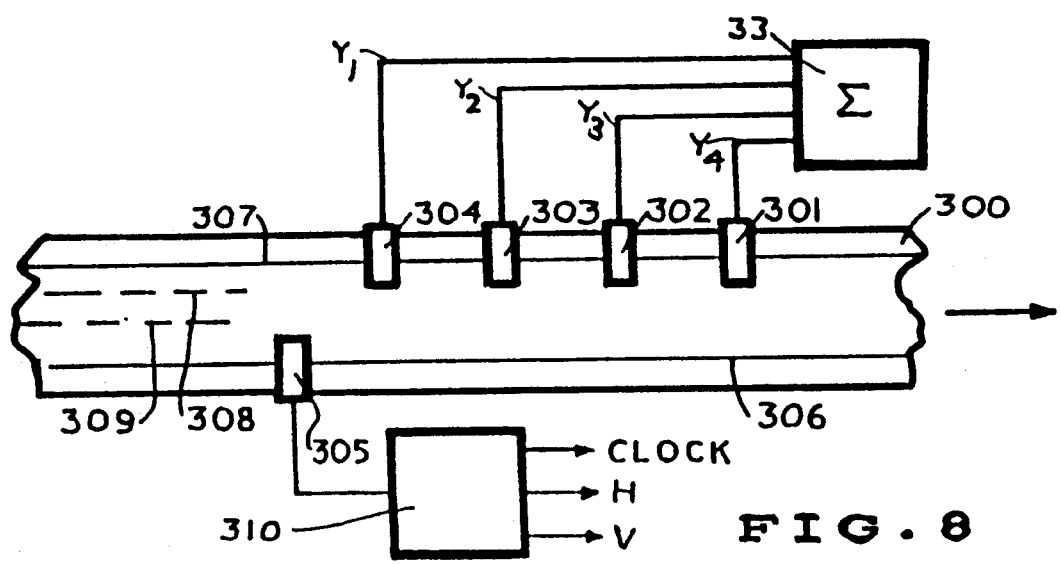
FIG. 8 represents constituent means that may be substituted for corresponding constituent means of FIG. 3, whereby the receiver processes a dither-quantized video component stored on a recording medium.

FIG. 8 shows a video record and playback means arranged to furnish signals $Y_1$-$Y_4$ to adder 33, line- and frame-sync signals H and V to display means, and the clock signal; they replace decoder 30, a/d converter 31 and delay line 32 of FIG. 3.

We assume for convenience that the recording medium is a magnetic tape 300 and that Y, I and Q video components are recorded as digital signals on tracks 307, 308 and 309, respectively; equivalent means using other media and other recording formats will be obvious to persons skilled in the art. Tape 300 of FIG. 8 has recorded thereon video and timing signals, the Y video component being recorded with two bits per Nyquist sample on track 307. Playback heads 301-304 are displaced from each other such that, as the tape moves to the right (as indicated by arrow), they read Y samples from four successive frames and deliver $Y_1$-$Y_4$ samples like those of FIG. 3 to adder 33. Track 306 is a timing track from which reading head 305 extracts clock signals and the requisite H and V sync signals. Reference samples $Y_1$-$Y_4$ and the sync and clock signals are therefore utilized in the overall system in the same manner as the correspondingly labelled signals in FIG. 3. Dither-quantized chrominance components that may be recorded on tracks 308 and 309 can be processed like the luminance signal Y, making allowance for differences in sampling rate, number of input levels and number of reference samples, if necessary.

Space Domain Embodiment

Figure 4:
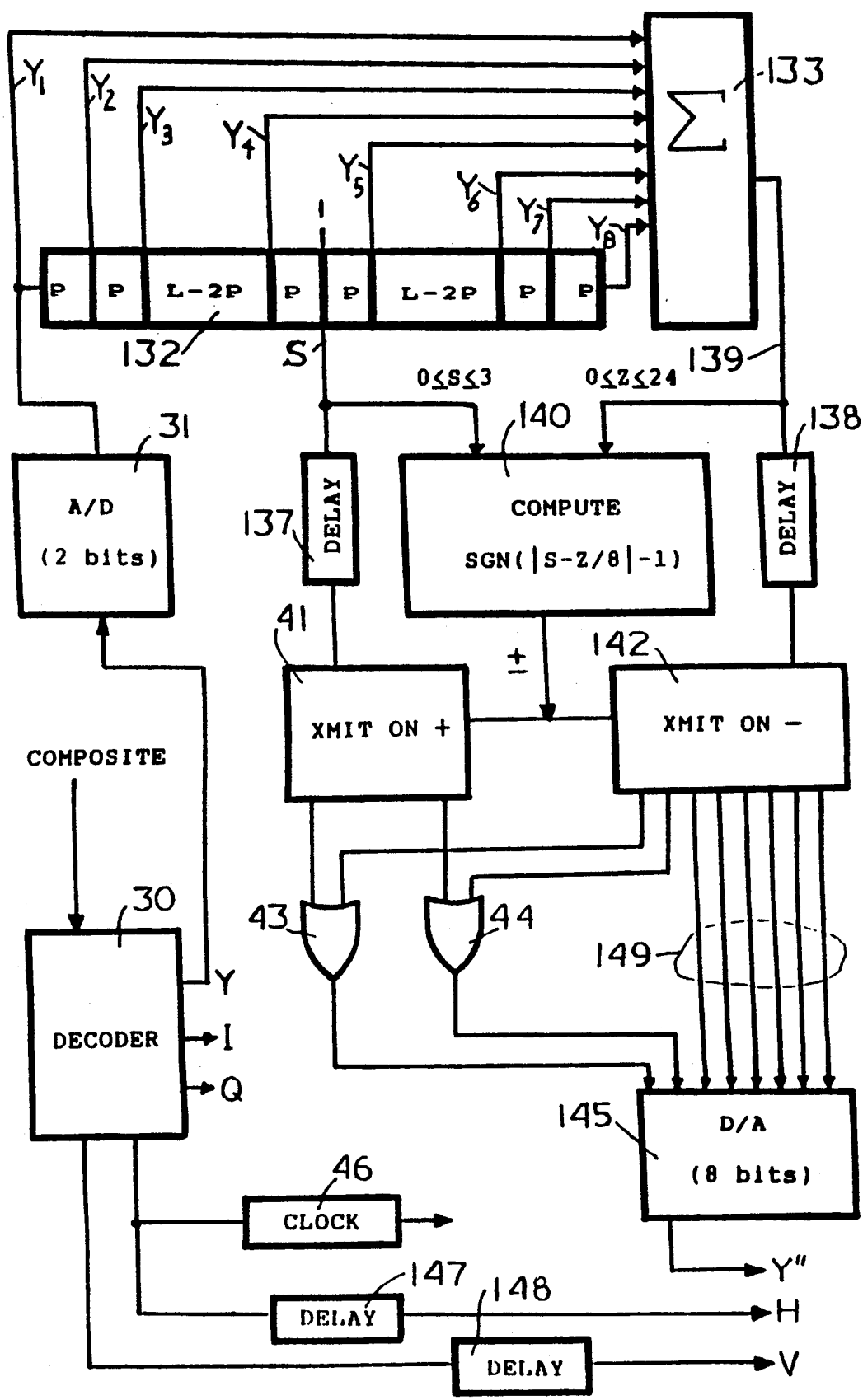
FIG. 4 shows a portion of a television receiver arranged to process an incoming dither-quantized video component according to another invention embodiment.

In the embodiment of the invention exemplified by FIG. 4, reference samples to be compared are extracted from a small area on one frame of the TV picture. This particular embodiment is therefore capable of operating on Y inputs dither-quantized with single-phase, as well as multiphase, dithers.

FIG. 4 is a schematic drawing arranged like FIG. 3. Decoder 30, a/d converter 31, gating means 41, OR gates 43 and 44 and clock 46 are substantially as in FIG. 3. Tapped delay line 132 has total delay slightly more than two line intervals and may be a shift register, acoustic delay line, or equivalent means of prior art. The letter P on the delay-line representation signifies delay of one pels period and L signifies delay of one line period.

Figure 6:
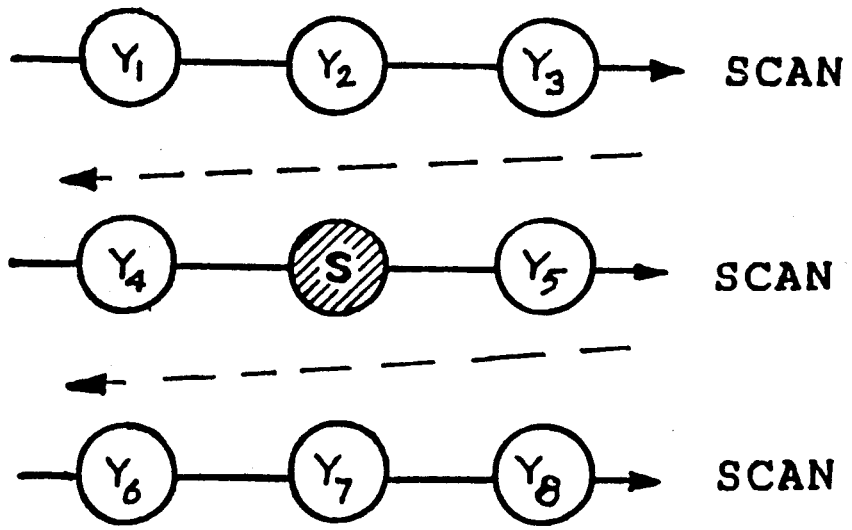
FIG. 6 shows the pattern of pels compared on one TV frame in the embodiment of FIG. 4.

Nine samples, labelled S and $Y_1$ to $Y_8$ inclusive, are extracted from tapped delay 132. FIG. 6 shows the corresponding arrangement of nine pels on a frame, assuming non-interlaced scanning. In relation to S, shown In the center, $Y_4$ is one pel to the left and $Y_5$ is one pel to the right; $Y_2$ is immediately above S with $Y_1$ to its left and $Y_3$ to its right; and $Y_6$, $Y_7$ and $Y_8$ are disposed likewise on the scanning line immediately below.

Returning to FIG. 4, decoder 30 obtains Y, I and Q components and H and V sync signals. A/d converter 31 generates a stream of 2-bit binary samples. Reference samples $Y_1$ to $Y_8$, inclusive, go to digital adder 133 which adds together eight concurrent binary numbers and delivers stream 139. The latter comprises Z samples corresponding to the sums. Inasmuch as each of the eight inputs to the adder has amplitude of 0, 1, 2 or 3, a Z sample has 25 possible values, ranging from 0 to 24 inclusive, and is therefore represented by eight bits.

The stream of S samples and the stream of Z samples enter arithmetic unit 140 which computes the algebraic sign of the quantity $$|s - z/8| - 1.$$

The sign is negative when the absolute difference between concurrent values of S and Z/8 is less than unity and positive otherwise. A positive output from unit 140 enables transmission of the current S sample through gating unit 41 and a negative output enables transmission of the Z sample through gating unit 142.

Between gating units 41 or 142 and d/a converter 145, a separate connecting line is drawn for each bit of a transmitted binary number. Since S samples have two bits and Z samples eight bits, the more significant S bit and the most significant Z bit are presented to OR gate 43 while the less significant S bit and the second-most-significant Z bit go to OR gate 44. The remaining six Z bits, collectively labelled 149, and the two OR gate outputs go to 8-bit d/a converter 145 as shown in the drawing, the output from 43 being the most significant bit. When the output from 140 is positive, the amplitude of a Y" sample from d/a converter 145 is quantized to levels of 0, 1, 2 or 3 units and when it is negative, Y" amplitudes range from 0.000, 0.125, ..., etc., up to 2.875 and 3.000, in the same units. In effect, seven new levels are interpolated within each input step.

It may be necessary to provide delay units 137 and 138 for S and Z to compensate for delay between input and output of unit 140. Delay units 147 and 148 compensate the timing of H and V sync signals for the delay between S and the Y input from unit 30.

The operation of the means of FIG. 4 can be explained as follows: At the moment when the pel corresponding to S is being scanned, tapped delay line 132 provides samples corresponding to the eight pels immediately surrounding S. Addition of eight amplitudes in adder 133 produces the sum Z and Z/8 represents the mean luminance of the eight pels, in the same units as S.

Suppose that the picture is such that the unquantized input Y' of FIG. 1 remains constant in value throughout an area defined by the eight reference samples: then an amplitude difference between the dither-quantized S sample and the mean of the eight dither-quantized reference samples must be due to stipple. Such a difference does not exceed one quantum step in absolute value and results in a negative output from computation means 140. Small variations among the reference samples due to gradual picture shading may still allow a negative output.

When means 140 of FIG. 4 delivers a negative signal, gating unit 142 and OR gates 43 and 44 provide to d/a converter 145 an 8-bit sample corresponding to Z/8, the mean of the reference samples. This mean can reproduce gradual shading but cannot follow the pel-to-pel amplitude variations needed to preserve spatial resolution in picture edges and similar image detail. However, wherever the difference between Z/8 and S exceeds a quantum step when such detail is being scanned, unit 140 delivers a positive signal so that S, not Z/8, is transmitted to the d/a converter.

Modifications of FIG. 4 for interlaced scanning will be obvious to persons having reasonable skill in the art. It will also be clear that the sampling arrangement depicted in FIG. 6 is only one example of various suitable arrangements, not necessarily restricted to nine samples as shown. Sample S could be included among those transmitted to adder 133 in FIG. 4, provided that the sum were then divided by 9 so that the mean were Z/9 instead of Z/8.

Spatio-Temporal Embodiment

Other embodiments of the invention combine frame-to-frame comparison and averaging as in FIG. 3 with within-frame comparison and averaging as in FIG. 4. I may, for example, modify the system of FIG. 4 by substituting tapped delay means 232, shown in FIG. 5, for means 132 of FIG. 4. Lettering between taps of 232 indicate the various amount of delay: P means one pel period and L one line-scan period while F indicates a frame period. Reference sample $Y_5$ is used for the S sample.

Figure 7:
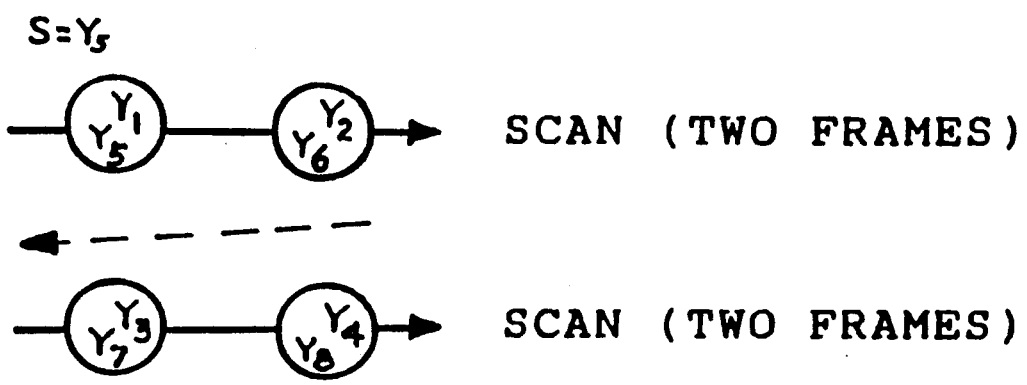
FIG. 7 shows the pattern of pels compared on two successive frames for the embodiment of FIG. 5.

Again assuming non-interlaced scanning, FIG. 7 shows the arrangement of pels corresponding to the eight reference samples obtained from unit 232. It should be understood that $Y_1$–$Y_4$ correspond to four pels of a first frame and $Y_5$–$Y_8$ correspond to the congruent set of four pels on the next frame, Samples $Y_1$–$Y_8$ go to adder 133 of FIG. 4. $Y_5$ also goes to 137 and 140 in the role of S. Otherwise, the system operates like the embodiment of FIG. 4. Use of $Y_5$ for S obviates the need for large delay in sync-compensating units 147 and 148.

General Comments

The time-domain embodiment of the invention of FIG. 3 reduces stipple amplitudes in uniform picture areas of each TV frame without broadening or smearing the dots or reducing spatial resolution. The space-domain embodiment of FIG. 4, on the other hand, reduces the spatial resolution in the detail that stipple adds in uniform picture areas, and reduces stipple dot amplitudes, except at picture edges or other spatial detail. In either case, additional Intensity levels are interpolated in those regions of the picture wherein artifacts are most critical.

When a TV transmitter employing self-interpolating dither and quantizing coarsely is used in conjunction with a TV receiver (exemplified by FIG. 3) that operates in the time domain and takes the mean of a suitable number of frames, the displayed TV picture corresponds, at least in stationary areas, to one quantized much more finely in the transmitter and displayed on a receiver not improved according to the present invention; specifically, a TV signal sent with L-level samples and averaged over n frames is displayed as if $nL-n+1$ levels had been transmitted.

Television systems of the disclosed invention have no need for motion-compensation apparatus if constructed to include steps 23 and 24 of FIG. 2.

Although self-interpolating multiphase dithers are preferred, video signals dither-quantized with other time-varying dithers also benefit from the invention, and even stationary dithers may benefit from the embodiment exemplified in FIG. 4.

I may make various other modifications to the invention as disclosed herein without departing from its spirit. For example:

I may substitute equivalent analog means and processing for some of all of the digital means disclosed.

I may use other reference samples for S, instead of as shown in the various drawings, I may use any plural number of reference samples for the mean.

Corresponding to the test in step 23 of FIG. 2, I may take the absolute difference between a sample S and the mean of a set of reference samples and compare the difference with a constant value other than the value of one quantum step.

I may provide several reference sets having unequal numbers of reference samples, make plural comparisons corresponding to step 23 of FIG. 2, and arrange to transmit the mean of the largest set of reference samples meeting the criterion of step 23, FIG. 2.

While I have disclosed the invention in terms of specific embodiments, other equivalent embodiments will no doubt be obvious to persons having normal skill in the art and it is intended that the invention be construed to include all such equivalent modifications.

I claim:

1. A method for modifying a dither-quantized video signal comprising steps of:
   a) providing a dither-quantized video signal represented by a series of video samples restricted to a specific number of sample amplitudes;
   b) corresponding to a particular video sample, providing an other video sample having amplitude equivalent to an arithmetic mean amplitude of a plurality of video samples of said series;
   c) comparing the amplitudes of said particular and said other video samples; and
   d) substituting said other video sample for said particular video sample whenever their respective amplitudes differ by less than a predetermined amount.

2. The method of claim 1 wherein said particular video sample and said plurality of video samples correspond to a particular element of the television raster as scanned during different frames.

3. The method of claim 1 wherein said particular sample and said plurality of samples correspond to picture elements arranged in specified configuration on a television frame.

4. Apparatus for interpolating additional intensity levels in a television picture corresponding to a dither-quantized video signal, said signal represented by a stream of samples characterized by a fixed number of sample amplitudes, said means including:
   a) means for comparing the amplitude of a particular one of said samples with an arithmetic mean amplitude of a plurality of said samples; and
   b) means for changing the amplitude of said particular sample to said arithmetic mean amplitude when the difference therebetween does not exceed a predetermined amount.

5. The means of claim 4 wherein the predetermined amount of amplitude difference is substantially equal to the difference between consecutive values of the fixed number of sample amplitudes.

6. The means of claim 4 further including means for displaying said television picture after change in the amplitude of said particular sample.

7. The means of claim 4 wherein said means for comparing includes means for delaying different samples by different amounts.

8. The means of claim 4 further including means for storing said stream of samples on a recording medium and means for comparing stored samples.

9. A receiver for a television signal, said signal embodying a first temporal series comprising coarser video samples dither-quantized according to N discrete amplitude levels corresponding to N levels of luminous intensity, N an integer larger than unity, said receiver including:
   means for providing, in synchronism with the coarser samples of said first series, a series of finer video samples quantized according to more than N discrete amplitude levels, the amplitude of a particular finer sample being the arithmetic mean amplitude of K coarser samples in predetermined temporal relations thereto, K an integer larger than unity; and
   means for displaying a television picture with more than N levels of luminous intensity.

10. The television receiver of claim 9 arranged to receive coarser video samples dither-quantized with a self-interpolating multiphase dither, and having the integer K such that finer samples corresponding to a particular area of the televised image wherein luminous intensity is constant have amplitudes limited to two successive amplitude levels.

11. The television receiver of claim 9 further including:
    means for choosing between a larger number of luminous intensity levels, corresponding to a larger number of coarser samples, and a smaller number of luminance levels, corresponding to a smaller number of coarser samples, to be displayed at an element of said television picture;
    said means including means for comparing the luminous intensities realizable from said larger and said smaller numbers of intensity levels and for electing the smaller number of levels when said intensities differ by more than a predetermined amount.

12. A television system comprising:
    a) camera means for generating a video signal suitable for television;
    b) means for dither-quantizing said video signal to produce a first stream comprising coarser samples quantized according to N discrete values, N an integer larger than unity;
    c) means for obtaining a second stream comprising finer samples quantized according to more than N discrete values, the value of a particular finer sample being the arithmetic mean value of K coarser samples of said first stream, said K samples having predetermined temporal relations to said particular finer sample, K an integer larger than unity; and
    d) means for displaying a television image corresponding to said second stream of samples.

13. The television system of claim 12 further including transmitter means arranged to send said first stream to a receiver and means of the receiver arranged to obtain said second stream.

14. The television system of claim 12 further including:
    a) means for comparing a coarser sample of said first stream with a corresponding finer sample of said second stream;
    b) means for producing a compound stream of samples incorporating a finer sample when it differs from its corresponding coarser sample by less than a predetermined amount and incorporating the coarser sample otherwise; and
    c) means for displaying a television image corresponding to said compound stream of samples.

15. The television system of claim 12 further including:
    a) means for producing a third stream comprising still-finer samples, each corresponding in value to the arithmetic mean of more than K coarser samples selected from said first stream;
    c) means whereby the coarser sample compared with a corresponding finer sample is additionally compared with a corresponding still-finer sample;
    d) means for producing a compound stream of samples incorporating said still-finer sample unless it differs from its corresponding coarser sample by more than a predetermined amount, otherwise incorporating the corresponding finer sample unless it differs from said coarser sample by more than a predetermined amount, and incorporating said coarser sample when neither the finer nor the still-finer sample is incorporated; and e) means for displaying a television image corresponding to said compound stream of samples.

16. The television system of claim 12
wherein said dither-quantizing means employs a self-interpolating multiphase dither; and
wherein the value of said integer K is such that samples from said second stream relating to a particular area of the televised image wherein luminous intensity is constant are confined to two amplitudes corresponding to a successive pair of discrete values.

17. The television system of claim 16 wherein samples representing a picture element on successive frames have at most two successive discrete values in picture areas having insignificant movement or change.

18. The television system of claim 12
wherein said dither-quantizing means employs a self-interpolating multiphase dither; and
wherein the value of said integer K is such that finer samples from said second stream relating to one picture element during successive television frames are confined to two amplitude values corresponding to a successive pair of discrete values, provided that said element pertains to a part of the televised scene free from significant movement or change.

19. A receiver for color television comprising:
means for acquiring a set of signals representing video components corresponding to color components of a televised scene, including a dither-quantized video component represented by a first series of signal samples comprising coarser samples restricted to N discrete amplitude levels, N an integer larger than unity;
means for providing, in synchronism with said first series, a second series of signal samples comprising finer samples with more than N discrete amplitude levels, the amplitude of a particular finer sample being the arithmetic mean amplitude of K coarser samples characterized by predetermined temporal relations to said particular finer sample, K an integer larger than unity; and
means for displaying a colored television picture corresponding to video components, including a video component represented by said second series of signal samples.

20. The television system of claim 19 wherein said K coarser samples are selected from a group and occurring periodically in said first series at the field frequency in said video signal.

21. The television receiver of claim 19 wherein samples of said first series are quantized according to a self-interpolating multiphase dither;
said receiver being further characterized by a value for the integer K such that the amplitudes of those finer samples of said second series relating to a particular area of the televised scene are confined to two successive discrete amplitude levels when the corresponding color component has constant intensity throughout said area.

22. The receiver of claim 19 wherein said particular finer sample and said K coarser samples are synchronous with the scanning of a specific element of the television raster during various frames.

23. The television receiver of claim 19 having N larger than two and further including:
means for choosing between a coarser sample and the corresponding finer sample to define the color displayed at an element of said television picture, including means for comparing the discrete amplitudes pertaining to said coarser and finer samples, and for electing the coarser sample when the amplitudes differ by more than a predetermined amount.

24. The television receiver of claim 23 further including means for displaying a colored television picture wherein samples for a video component are elected by said means for choosing.

* * * * *

UNITED STATES PATENT AND TRADEMARK OFFICE
CERTIFICATE OF CORRECTION

PATENT NO. : 5,253,045
DATED : October 12, 1993
INVENTOR(S) : Bernard Lippel

It is certified that error appears in the above-indentified patent and that said Letters Patent is hereby corrected as shown below:

In the Drawing:
In Fig.4, the connection designated 149 and mistakenly shown by means of six parallel lines should be shown by means of three parallel lines. The legend on unit 145 should read ---D/A (5 bits)--- instead of " D/A (8 bits)".

In Column 7:
Line 2, replace "eight" by -- five --.
Line 7, replace "8-bit" by -- 5-bit --.
Line 41, replace "8-bit" by -- 5-bit --.

Signed and Sealed this

Fifth Day of July, 1994

Attest:

BRUCE LEHMAN

Attesting Officer

Commissioner of Patents and Trademarks